(12) United States Patent  (10) Patent No.: US 7,919,021 B2
Baba et al.  (45) Date of Patent: Apr. 5, 2011

(54) METHOD FOR PRODUCING OPTICAL SHEET

(75) Inventors: Kazuo Baba, Niigata (JP); Kazunori Hirose, Niigata (JP); Yoshihiro Oda, Niigata (JP); Etsuo Nakazato, Niigata (JP); Ichiro Matsuzaki, Ibaraki (JP)

(73) Assignee: Kuraray Co., Ltd., Okayama (JP)

( * ) Notice: Subject to any disclaimer, the term of this patent is extended or adjusted under 35 U.S.C. 154(b) by 924 days.

(21) Appl. No.: 10/547,761

(22) PCT Filed: Mar. 3, 2004

(86) PCT No.: PCT/JP2004/002629
§ 371 (c)(1),
(2), (4) Date: Sep. 2, 2005

(87) PCT Pub. No.: WO2004/078455
PCT Pub. Date: Sep. 16, 2004

(65) Prior Publication Data
US 2006/0145374 A1 Jul. 6, 2006

(30) Foreign Application Priority Data

Mar. 4, 2003 (JP) ................................. 2003-056506
Aug. 21, 2003 (JP) ................................. 2003-297811

(51) Int. Cl.
*B29D 11/00* (2006.01)
(52) U.S. Cl. ...................................... 264/1.6; 264/210.1
(58) Field of Classification Search ................ 264/1.1, 264/1.33, 1.6, 2.5, 2.7, 210.1; 425/808
See application file for complete search history.

(56) References Cited

U.S. PATENT DOCUMENTS 5,433,897 A * 7/1995 Kanome et al. ............. 264/1.33

FOREIGN PATENT DOCUMENTS

| JP | 4-283737 | 10/1992 |
|---|---|---|
| JP | 9-120101 | 5/1997 |
| JP | 10-006398 | 1/1998 |
| JP | 10-007737 | 1/1998 |
| JP | 10-264237 | 10/1998 |
| JP | 10-315304 | 12/1998 |
| JP | 11-288084 | 10/1999 |
| JP | 11-343351 | 12/1999 |
| JP | 2001-113538 | 4/2001 |
| JP | 2002-36332 | 2/2002 |
| JP | 2002-36333 | 2/2002 |
| JP | 2003-185844 | 7/2003 |

* cited by examiner

*Primary Examiner* — Mathieu D. Vargot
(74) *Attorney, Agent, or Firm* — Oblon, Spivak, McClelland, Maier & Neustadt, L.L.P.

(57) ABSTRACT

The present invention aims at providing a manufacturing method for an optical sheet capable of manufacturing a thin optical sheet of a uniform thickness distribution with a high thickness accuracy, and high shaping/transferring performances, and an optical sheet manufactured by using the manufacturing method. A manufacturing method for an optical sheet according to the present invention includes passing a resin discharged from a die between a touch roll and a shaping roll under pressure.

5 Claims, 7 Drawing Sheets

COMPARATIVE CHART OF EXAMPLES

| | EXAMPLE 1 | EXAMPLE 2 | EXAMPLE 3 | EXAMPLE 4 | EXAMPLE 5 | COMPARATIVE EXAMPLE 1 | COMPARATIVE EXAMPLE 2 |
|---|---|---|---|---|---|---|---|
| RAW MATERIAL | MS RESIN WITH RUBBER | MS RESIN WITH RUBBER | PET | MS RESIN WITH RUBBER | MS RESIN WITH RUBBER | MS RESIN WITH RUBBER | MS RESIN WITH RUBBER |
| MRF | 1.5 | 1.5 | — | 3.9 | 3.9 | 1.5 | 1.5 |
| INTRINSIC VISCOSITY (IV) | — | — | 0.85 | — | — | — | — |
| DENSITY kg/m$^3$ | 1100 | 1100 | 1390 | 1082 | 1082 | 1100 | 1100 |
| RESIN TEMPERATURE °C | 250 | 270 | 290 | 280 | 280 | 250 | 250 |
| ESTIMATED VISCOSITY Pa·sec | 1295.6 | 579.8 | 13.7 | 1160 | 1160 | 1295.6 | 1295.6 |
| ACTUALLY MEASURED TEMPERATURE OF DISCHARGED RESIN | 239 | 241 | 270 | 247 | 247 | 234 | 238 |
| ESTIMATED VISCOSITY OF DISCHARGED RESIN Pa·sec | 2016.1 | 1860.3 | 33.5 | 2034 | 2034 | 2464.9 | 2098.8 |
| MOLDING SPEED m/min | 10 | 10 | 10 | 16.0 | 25.0 | 5.7 | 5.8 |
| AIR GAP mm | 80 | 95 | 80 | 100 | 80 | 120 | 105 |
| RESIN TEMPERATURE UPON TOUCH WITH ROLL (CALCULATE VALUE) | 223.9 | 223.6 | 253.7 | 235 | 235 | 217 | 208.9 |
| ESTIMATED VISCOSITY UPON TOUCH WITH ROLL Pa·sec | 3699.4 | 3744.3 | 69.5 | 2560 | 3560 | 4882.0 | 6761.0 |
| FIRST ROLL | RUBBER ROLL | ELASTIC METAL ROLL | RUBBER ROLL | ELASTIC METAL ROLL | ELASTIC METAL ROLL | SHAPING ROLL | ELASTIC METAL ROLL |
| OUTER DIAMETER mm | φ290 | φ250 | φ290 | φ400 | φ400 | φ400 | φ250 |
| DEFORMATION RATE TO DIAMETER UNDER LINEAR PRESSURE OF 30kg/cm % | 0.08 | 0.11 | 0.08 | 0.11 | 0.11 | 0.004 | 0.11 |
| TEMPERATURE °C | 40 | 60 | 40 | 78 | 78 | 65 | 50 |
| SECOND ROLL | SHAPING ROLL | SHAPING ROLL | SHAPING ROLL | SHAPING ROLL | SHAPING ROLL | SHAPING ROLL | METAL ROLL |
| OUTER DIAMETER mm | φ400 | φ250 | φ400 | φ400 | φ400 | φ400 | φ250 |
| TEMPERATURE °C | 90 | 75 | 40 | 80 | 90 | 91 | 65 |
| THIRD ROLL | METAL ROLL | METAL ROLL | SHAPING ROLL | METAL ROLL | METAL ROLL | SHAPING ROLL | METAL ROLL |
| OUTER DIAMETER mm | φ200 | φ250 | φ200 | φ400 | φ400 | φ450 | φ250 |
| TEMPERATURE °C | 60 | 40 | 30 | 78 | 78 | 70 | 40 |
| THICKNESS μm | 185±4 | 188±3 | 175±5 | 181±2.5 | 105±1.5 | 378±8 | 188±9 |
| SHAPING RATE % | 97 | 99 | 95 | 97 | 97 | 85 | 97 |
| APPEARANCE UNIFOMITY | ○ | ○ | ○ | ○ | ○ | △ | × |

*Fig. 7*

METHOD FOR PRODUCING OPTICAL SHEET

TECHNICAL FIELD

The present invention relates to a manufacturing method for an optical sheet, an optical sheet, and a manufacturing method for a lenticular lens sheet.

BACKGROUND ART

In conventional manufacturing methods for an optical sheet, a sheet resin material extruded from an extrusion die is passed under pressure through a gap between a pair of engraved roll and mirror-finished metal roll to manufacture a resin sheet. With such a manufacturing method, it is necessary to use a rigid roll with the pressing force allowing some uniform sheet thickness to manufacture a sheet with any optical performance. It is also necessary to transfer a reverse pattern engraved on a mold roll onto a sheet to create the smooth surface or particular surface shape as is necessary for exhibiting an optical performance, at some shaping rate.

In recent years, there is a growing demand for thinner optical sheets in response to needs to downsize the lens to shorten a focal distance for high definition (fine pitch), or needs to reduce a size and weight of an optical sheet itself.

However, with the manufacturing method based on the extrusion molding, it is difficult to produce a thin sheet having such a shape that gives an optical performance sufficient for optical use, with a high thickness accuracy. This is because the contact between a roll and a resin gets worse owing to an unbalanced relation between a resin pressure and a pressing force/rigidity of a roll, which causes the roll to deform on the thin sheet requiring a high thickness accuracy, and the deformed roll cannot press the central portion of the sheet, making it impossible to attain such a thickness distribution that realizes the uniform optical performance.

Meanwhile, as another conventional method of manufacturing a thin sheet, there is a method of manufacturing a resin sheet using a rubber or metal-made elastic roll with a smooth surface as a touch roll (see Japanese Unexamined Patent Publication Nos. 2002-36332 and 2002-36333). However, the metal-made elastic roll with a smooth surface is exclusively applicable to a smooth surface sheet, and even when creating projections or depressions on the sheet, the roll transfers the embossed surface to the sheet at most. To that end, the roll hardly produces an optical functional sheet with a shaping rate and transfer accuracy high enough for optical usage.

Further, there have not been made extensive efforts to transfer a desired lens shape with the method of manufacturing a smooth sheet using this elastic roll based on the common belief that the resin is cooled and solidified on contact with a mold roll, and sufficient transferability cannot be achieved unless the resin is applied with enough pressure upon molding. In particular, conventional manufacturing methods for an optical sheet hardly produce an optical sheet satisfying all of conditions such as the thickness of 300 μm or smaller, a pitch of 300 μm or smaller, and the mold height of 30 μm or larger.

With the aforementioned manufacturing methods for an optical sheet, the shape that gives an optical performance can be transferred with the use of a rigid roll, but a thin film of a uniform thickness distribution is difficult to form with a high thickness accuracy. A thin sheet of a uniform thickness distribution can be produced with a high thickness accuracy by use of an elastic roll, but it is impossible to attain shaping/transferring performances enough for optical use. As a result, the high thickness accuracy for the optical sheet and the high shaping/transferring performances could not be both fulfilled at the same time.

In general, a rear projection screen used for, e.g., a rear projection television is a laminate of two lens sheets. One of the lens sheets, a Fresnel lens sheet, is arranged on a light source side and functions to focus image light from a CRT light source or image light having passed through liquid crystal so as to fall within a predetermined angular range. The other lens sheet, a lenticular lens sheet, is arranged on an observer side, and functions to diverge the image light having passed through the Fresnel lens sheet to an appropriate angular range.

A lens sheet of a fine pitch is required especially for a high definition and high quality rear projection type liquid crystal projection television. Such a lens sheet structure is disclosed in, for example, Japanese Unexamined Patent Publication No. 09-120101. FIG. 8 shows the structure of the lens sheet disclosed in Japanese Unexamined Patent Publication No. 09-120101. As shown in FIG. 8, the lens sheet 101 includes a lenticular lens sheet 102, an external light absorbing layer 103, a diffusion layer 104, and a transparent resin film 105.

The lenticular lens sheet 102 is composed of lens portions 1021 and a transparent supporting member 1022. In general, the lens portions 1021 are formed on the transparent supporting member 1022 with photo-setting resin (hereinafter referred to as "2P resin").

The external light absorbing layer 103 is arranged on a light exit surface side of the lenticular lens sheet 102 in a position at which the lenticular lens 1021 does not focus the light, that is, a non-light-passing position. The provision of the external light absorbing layer 103 makes it possible to reduce return light back to the observer side, which is a part of the external light incident on the lenticular lens sheet 102 reflected by the light exit surface of the lenticular lens sheet 102, resulting in improvement of an image contrast.

The external light absorbing layer 103 is formed by forming a photosensitive layer on a flat portion of the lenticular lens sheet 102 and then bonding a transfer film coated with a black coating material onto the photosensitive layer, and transferring the black coating material to a portion of the photosensitive layer where the diffusion layer 104 is to be formed (see Japanese Unexamined Patent Publication No. 2001-113538).

Further, the diffusion layer 104 is formed on the light exit surface side of the lenticular lens sheet 102. In the lens sheet 101, while the diffusion of a lens of incidence mainly defines the viewing angle in a horizontal direction, the diffusion layer 104 enables the light diffusion in a vertical direction. In addition, the lenticular lens sheet 2 is laminated with the transparent resin film 105 called a front plate via the diffusion layer 104. The transparent film 105 protects the lenticular lens sheet 102, and is arranged for the purpose of attaining surface glossiness equivalent to that of a general cathode-ray tube television.

Besides, although not shown in FIG. 8, a Fresnel lens sheet is generally provided on a light incident surface side of the lenticular lens sheet 102. This Fresnel lens sheet is made up of a sheet on a light exit surface of which a Fresnel lens is provided. The Fresnel lens is composed of lenses arranged at regular intervals and fine pitches in a concentric form.

In manufacturing the lenticular lens sheet 102 using the 2P resin in the above manner, there arises a problem of an increase in production cost for a rear projection screen due to the expensive 2P resin. There is another problem in that the productive facility for the lenticular lens sheet 102 is complicated because the transparent supporting member 1022 is formed and then, the lens portion 1021 is formed thereon.

Moreover, in the case of using the 2P resin, the lens portion 1021 differs from the transparent supporting member 1022 in material, which leads to poor environmental stability, and causes a lenticular lens sheet 1 to warp. Namely, a resin, which is in a liquid form at a production stage, is cured and completed as a sheet but warps due to a difference in shrinkage factor when cured.

Furthermore, the lens portion 1021 differs from the transparent supporting member 1022 in material, and thus a reflective index varies between the two materials in most cases. That is, the light incident on the lenticular lens sheet 102 enters and refracted in both the lens portion 1021 and the transparent supporting member 1022. The difference in refractive index between them causes color unevenness or limits the transparency in some cases.

Further, since the lens portion 1021 and the transparent supporting member 1022 are different in material, edge blunting easily occurs, and there is a limitation on the shaping performance.

As mentioned above, with the conventional manufacturing methods for an optical sheet, the shape that gives an optical performance can be transferred with the use of a rigid roll, but a thin film of a uniform thickness distribution is difficult to form with a high thickness accuracy. A thin sheet of a uniform thickness distribution can be produced with a high thickness accuracy by use of an elastic roll, but it is impossible to attain shaping/transferring performances enough for optical use. As a result, the high thickness accuracy for the optical sheet and the high shaping/transferring performances could not be both fulfilled at the same time.

The present invention has been made with a view to solving the above-mentioned problems, and therefore it is an object of the present invention to provide a manufacturing method for an optical sheet, which is capable of manufacturing a thin optical sheet of a uniform thickness distribution with a high thickness accuracy and high shape and transfer fidelity, and an optical sheet manufactured using the method.

Besides, the conventional manufacturing method for the lenticular lens sheet has a problem that two different materials are used and therefore, a low-cost, high-quality lenticular lens sheet cannot be formed.

The present invention has been also made in order to solve such a problem, and another object of the invention is to provide a manufacturing method for a lenticular lens sheet, which is capable of manufacturing a low-cost, high-quality lenticular lens sheet, and a lenticular lens sheet manufactured using the method.

DISCLOSURE OF THE INVENTION

The present invention provides a manufacturing method for an optical sheet for passing a thermoplastic resin discharged from a die between a touch roll and a shaping roll under pressure to manufacture an optical sheet, wherein a temperature of the resin discharged from the die is in a range of 250° to 290° C., a molding speed is in a range of 8 to 40 m/min., and an air gap between the die and a nip position between the touch roll and the shaping roll is 110 mm or smaller. The touch roll is an elastic roll deformable in a diameter direction by 0.01% or more of a diameter under a linear pressure of 30 kg/cm. According to the manufacturing method, a thin optical sheet of a uniform thickness distribution can be formed with a high thickness accuracy, and high shape and transfer fidelity.

Further, according to a preferred embodiment of the invention, the thermoplastic resin is one selected from the group consisting of a polymethylmethacrylate resin, a polycarbonate resin, a polystyrene resin, an MS resin, an AS resin, an ABS resin, a polypropylene resin, a polyethylene resin, a polyethylene terephthalate resin, a polyvinyl chloride resin, a thermoplastic elastomer, and a copolymer thereof.

Further, according to another preferred embodiment of the invention, the optical sheet is a lenticular lens sheet.

Besides, the present invention provides an optical sheet manufactured passing a thermoplastic resin discharged from a die between a touch roll and a shaping roll under pressure, wherein a thickness of the optical sheet is 350 µm or less, a mold pattern pitch is 290 µm or less, a mold height is within a range of 0 µm to 100 µm, and a transferring rate is 90% or more. Particularly, preferably, the thickness of the optical sheet is 200 µm or less, the mold pattern pitch is 200 µm or less, the mold height is within a range of 30 µm to 100 µm, and the transferring rate is 95% or more.

The optical sheet is manufactured passing a thermoplastic resin discharged from a die between a touch roll and a shaping roll under pressure, a temperature of the resin discharged from the die is in a range of to 250° to 290° C., a molding speed is set to 8 to 40 m/min., an air gap between the die and a nip position between the touch roll and the shaping roll is in a range of 110 mm or smaller, and the touch roll is an elastic roll deformable in a diameter direction by 0.01% or more of a diameter under a linear pressure of 30 kg/cm.

The present invention provides a manufacturing method for a lenticular lens sheet, including: a step of forming a lenticular lens sheet having a thickness of 350 µm or less through extrusion molding; a step of forming a photosensitive layer on a flat surface of the lenticular lens sheet; and a step of forming a light-shielding pattern by irradiating the photosensitive layer with light from a lenticular lens side of the lenticular lens sheet to form a cured portion and an uncured portion by use of light focused through the lenticular lens. According to the manufacturing method, a low-cost, high-quality lens sheet can be formed.

Further, the step of forming the light-shielding pattern includes placing an ink layer on the photosensitive layer, and transferring ink in the ink layer to the uncured portion of the photosensitive layer to form the light-shielding pattern.

Particularly preferably, the light is UV light, and the photosensitive layer is formed of a UV-curable photosensitive resin.

Further, the lenticular lens sheet is manufactured passing a thermoplastic resin discharged from a die between a touch roll and a shaping roll under pressure, in the step of forming the lenticular lens sheet, a temperature of the resin discharged from the die is in a range of to 250° to 290° C., a molding speed is in a range of to 8 to 40 m/min., an air gap between the die and a nip position between the touch roll and the shaping roll is 110 mm or smaller, and the touch roll is an elastic roll deformable in a diameter direction by 0.01% or more of a diameter under a linear pressure of 30 kg/cm. According to the manufacturing method, a thin optical sheet of a uniform thickness distribution can be formed with a high thickness accuracy, and high shaping/transferring performances.

A lens sheet according to the present invention is manufactured by using the manufacturing method for a lens sheet. The lens sheet thus manufactured costs low, and attains high quality.

BRIEF DESCRIPTION OF THE DRAWINGS

FIG. 7 is a table summarizing conditions adopted in examples and comparative examples of the present invention.

BEST MODE FOR CARRYING OUT THE INVENTION

Hereinafter, best modes for carrying out the present invention are described with reference to the drawings.

The following description of embodiments of the present invention is directed to a manufacturing method for a lenticular lens sheet taken as an example of an optical sheet. However, the present invention is not limited to this, and a prism lens sheet and other such optical sheets can be manufactured with the manufacturing method according to the present invention.

First Embodiment

Figure 1:
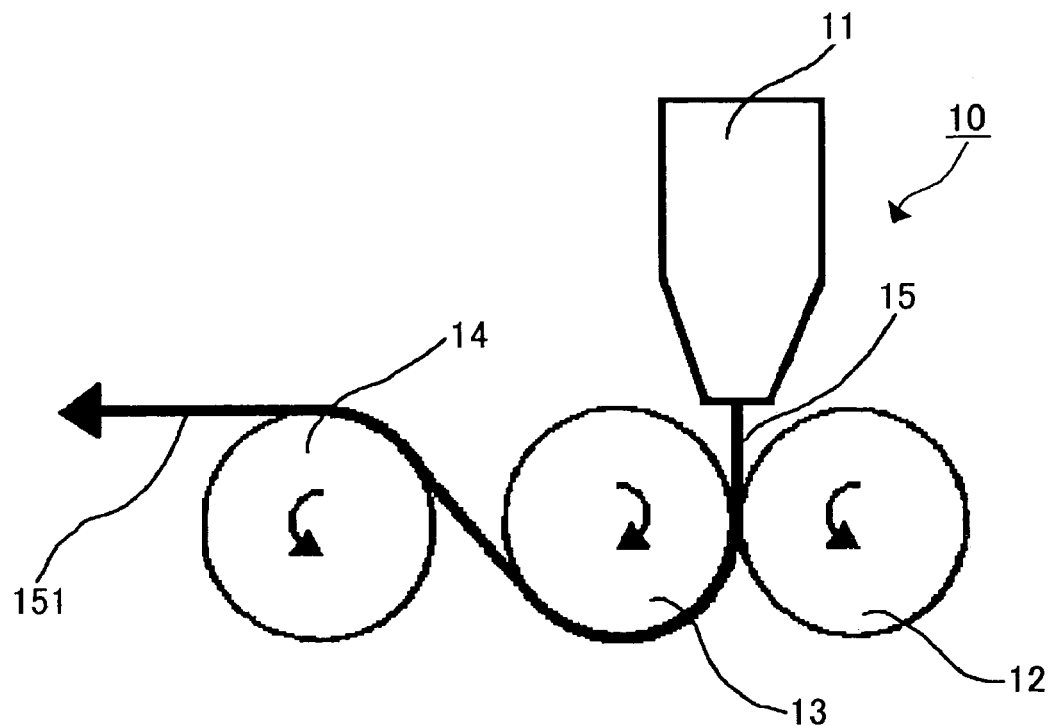
FIG. 1 is a schematic diagram showing a lenticular lens sheet manufacturing apparatus according to the present invention.

Referring now to FIG. 1, a manufacturing method for a lenticular lens sheet is described first. FIG. 1 is a sectional view showing a manufacturing apparatus for a lenticular lens sheet.

As shown in FIG. 1, a lenticular lens sheet manufacturing apparatus 10 includes a die 11, a first roll 12, a second roll 13, and a third roll 14.

The die 11 is a discharging member for discharging a resin 15 in a molten form by use of an extruder. A temperature of the resin 15 discharged from the die 11 preferably exceeds 230° C., more specifically, ranges from 250° C. to 290° C. With the resin temperature below 230° C., the melt viscosity of the resin is too high, leading to insufficient transferability of a shaping roll in some cases. In contrast, the resin temperature above 290° C. may accelerate thermal decomposition of the resin, resulting in a discolored and whitish resin.

The first roll 12 is a touch roll for pressing the molten resin 15 against the second roll 13. The first roll 12 is an elastic roll that deforms in the diameter direction by 0.01% or more of the diameter under the linear pressure of 30 kg/cm. As a metal material for the first roll, general structural steels such as carbon steel and hardening steel can be used. As a rubber material for the first roll, a heat-resistant silicon rubber or fluororubber can be used. In addition, the surface of the first roll 12 may be made of a material low in heat conductivity. Thus, it is possible to prevent the resin 15 from decreasing in temperature when in touch with the roll, and to keep the high temperature of the resin 15.

The second roll 13 is a main cooling roll for cooling and solidifying the resin 15 discharged in the molten form from the die 11. The second roll 13, which is a usual metal roll, is a shaping roll which has a mold of a lenticular lens engraved on the surface. A mold pattern pitch engraved on the second roll 13 is 290 μm or smaller, desirably 200 μm or smaller. Further, the mold height is in the range of 0 μm to 100 μm, desirably 30 μm or smaller. The mold pattern can be formed by using any general methods such as etching and blasting besides engraving.

The third roll 14 is an annealing roll for feeding the resin 15 in a sheet form cooled with the second roll 13 to a take-up machine. The third roll 14 is a usual metal roll like the second roll 13.

In addition, the resin 15 is a thermoplastic resin, for example, a polymethylmethacrylate resin, a polycarbonate resin, a polystyrene resin, an MS resin, an AS resin, an ABS resin, a polypropylene resin, a polyethylene resin, a polyethylene terephthalate resin, a polyvinyl chloride resin, a thermoplastic elastomer, or a copolymer thereof. Particularly desirable as the resin 15 is a resin of low melt viscosity such as a polycarbonate resin, an MS resin, an acrylic resin, or a PET resin. Further, the resin 15 may contain any additives such as a light diffusing material and an antistatic agent. A lenticular lens sheet 151 may be of either a single-layer structure or a multilayer structure.

As shown in FIG. 1, an air gap is defined between the die 11 and a nip position between the rolls 12 and 13. The nip temperature of the resin 15 varies depending on the size of the air gap and the temperature of the discharged resin 15 from the die 11. In this embodiment, the size of the air gap is desirably set to 110 mm or less; this value is smaller than a general gap size of 120 mm or more. With this size, the resin 15 can reach the rolls 12 and 13 more speedily without decreasing in temperature, thereby maintaining the high temperature of the resin 15.

Defined between the first roll 12 and the second roll 13 is a roll gap through which the resin 15 passes. The size of the roll is determined depending on the thickness of the lenticular lens sheet 151 formed of the resin 15, and is set to, for example, 350 μm or smaller, desirably, 200 μm or smaller.

Next, a manufacturing method for the lenticular lens sheet 151 using the manufacturing apparatus 10 is described.

In this embodiment, the molding speed for the lenticular lens sheet 151 is desirably set to 8 to 40 m/min., more desirably, 10 to 25 m/min.; this speed is higher than a general speed of 4 to 5 m/min. With this speed, the resin 15 can be kept from decreasing in temperature while in contact with the rolls, and the temperature of the resin 15 can be kept high.

First, the die 11 discharges the molten resin 15. The resin 15 discharged from the die 11 passes through the air gap and is fed from the nip position between the first roll 12 and the second roll 13 to the roll gap between the rolls 12 and 13. The resin 15 passing through the roll gap is pressed against the second roll 13 because the first roll 12 presses the second roll 13 with a predetermined pressing force. At this time, the second roll 13 has the mold for the lenticular lens, so the ridges and grooves of the lenticular lens are formed on the resin 15.

The resin 15 is cooled with the second roll 13 functioning as the main cooling roll when passing through the roll gap between the rolls 12 and 13. Then, the resin 15 leaves the roll gap in the sheet form that has the ridges and grooves of the lenticular lens. After that, the resin 15 is fed to the third roll 14 functioning as the annealing roll, turned into the lenticular lens sheet 151, guided to the unillustrated take-up machine, and subjected to a given treatment.

Figure 2A:
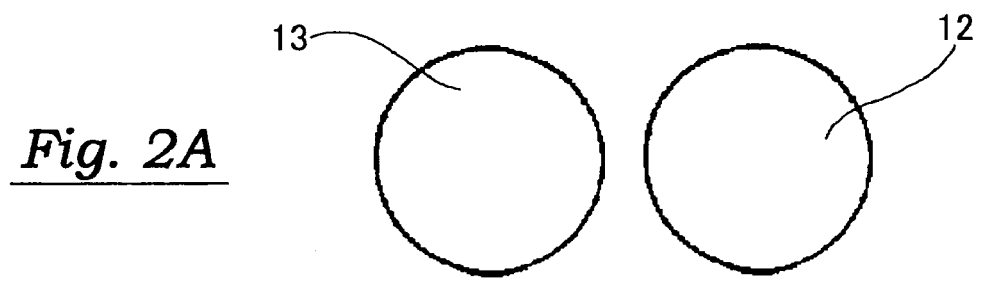
FIG. 2A is a schematic sectional view showing an undeformed elastic roll according to the present invention.
Figure 2B:
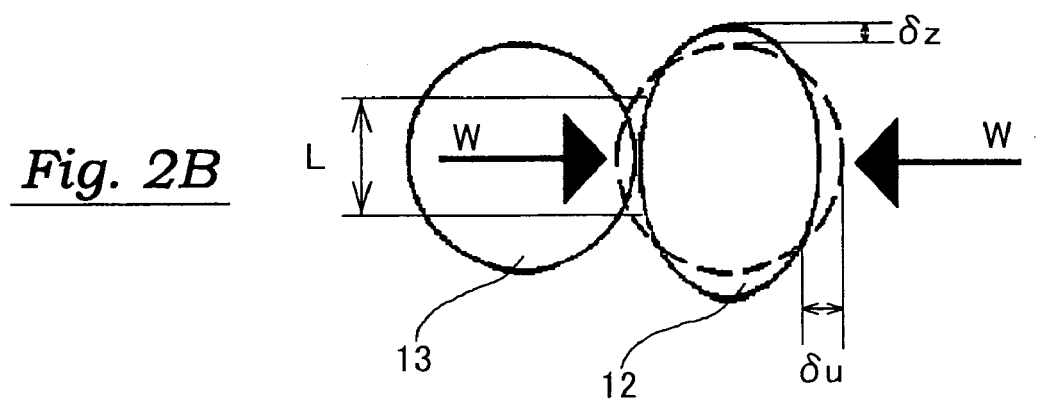
FIG. 2B is a schematic sectional view showing a deformed elastic roll according to the present invention.

Next, a detailed description is made of forms of the first roll 12 and the second roll 13 during a roll-pressing process. FIGS. 2A and 2B are schematic sectional views each showing how the first roll 12 deforms.

Referring first to FIG. 2A, a description is given of the forms of the rolls 12 and 13 in section taken along the direction vertical to the longitudinal direction thereof. FIG. 2A is a schematic sectional view showing the undeformed first roll 12, and FIG. 2B is a schematic sectional view showing the deformed first roll 12.

FIG. 2A is a schematic sectional view showing the first roll 12 before the roll-pressing process in section taken along the direction vertical to the longitudinal direction thereof. The first roll 12 presses the second roll 13 horizontally in FIG. 2B, and both the rolls 12 and 13 roll-press the resin 15. Then, as shown in FIG. 2B, the lateral load W is applied to the first roll 12 in FIG. 2B. Under the load W, the first roll 12 as the elastic roll is squashed and deformed, and elongated by $\delta z$ in the vertical direction in the figure in section taken along the direction vertical to the longitudinal direction thereof. At this time, the section taken along the direction vertical to the longitudinal direction of the first roll 12 also undergoes the lateral deformation in the figure, and reduces its width by $\delta u$. Thus, while the second roll 13 does not deform in section taken along the longitudinal direction thereof, the first roll 12 deforms in section taken along the direction vertical to the longitudinal direction on account of its elasticity, by which the rolls 12 and 13 can contact each other for a longer period.

Figure 3A:
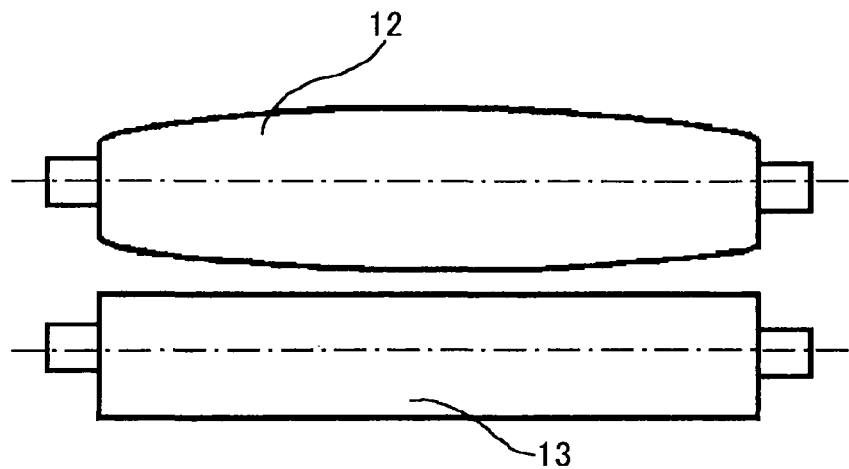
FIG. 3A is a schematic sectional view showing an undeformed elastic roll according to the present invention.
Figure 3B:
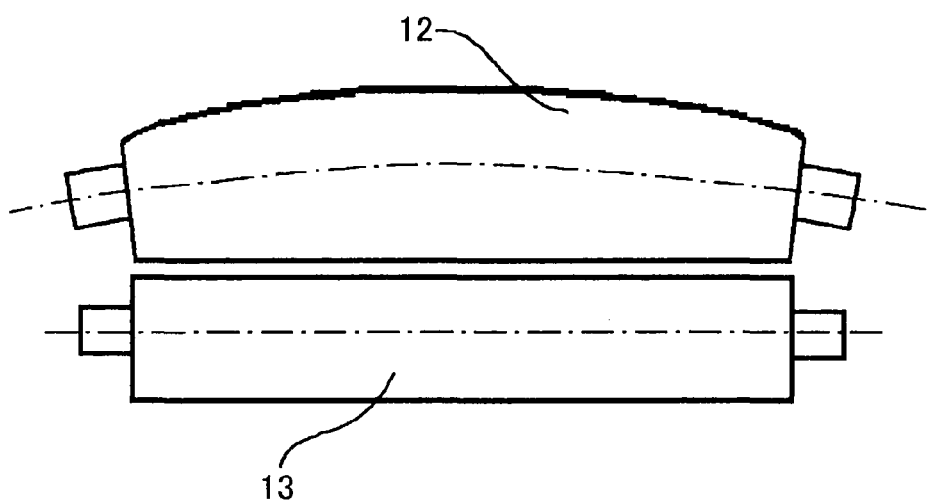
FIG. 3B is a schematic sectional view showing a deformed elastic roll according to the present invention.

Referring next to FIGS. 3A and 3B, a description is made of forms of the rolls 12 and 13 in section taken along the longitudinal direction thereof. FIG. 3A is a schematic sectional view showing the undeformed first roll 12, and FIG. 3B is a schematic sectional view showing the deformed first roll 12.

FIG. 3A is a schematic sectional view showing the first roll 12 before the roll-pressing process in section taken along the longitudinal direction thereof. The first roll 12 presses the second roll 13 in the vertical direction of FIG. 3B, and both the rolls 12 and 13 roll-press the resin 15. Then, as shown in FIG. 3B, the load W is applied to the first roll 12 in the vertical direction of the figure. Under the load W, the first roll 12 as an elastic roll deforms in the vertical direction of the figure, in section taken along the longitudinal direction thereof. As a result, the first roll 12 deforms in section taken along the longitudinal direction thereof on account of its elasticity, and the rolls 12 and 13 can contact each other with the larger contact length.

As discussed above, when the first roll 12 is an elastic roll, the first roll 12 deforms in the direction vertical to the longitudinal direction thereof, and thus can lengthen the time or length for the contact between the resin 15 and the second roll 13 on which the mold is engraved. In addition, when being made of rubber, the first roll 12 as the elastic roll can be pushed against the second roll 13 as a mold roll in close contact therewith (to full strength). In contrast, when elastic metal or the like forms the surface of the first roll 12, and cannot be pressed against the second roll 13 in close contact therewith (to full strength) when in use, a crowning roll of which the central portion is expanded is used for the first roll 12. Thus, when brought into contact with each other, the first roll 12 and the second roll 13 can contact each other for a longer period and with a larger contact length.

A description is next given of a preferred embodiment in which an elastic roll is used as the first roll 12 in the above manufacturing method for the lenticular lens sheet.

For example, when an elastic metal roll is used as the first roll 12, the first roll 12 deforms in the applied direction of the load W by 1.8 mm (0.45% of the diameter) under the linear pressure of 30 kg/cm, provided that a roll diameter $\phi$ is 400 mm, and the contact length of the resin 15 (corresponding to "L" in FIG. 2B) is 54.9 mm.

On the other hand, when a general metal roll is used as the first roll 12, the metal roll deforms by 0.01 mm (0.0025% of the diameter) in the applied direction of the load W under the linear pressure of 30 kg/cm, provided that the roll diameter $\phi$ is 400 mm and the roll thickness is 50 mm. After this deformation, the contact length of the resin 15 is about 4.2 mm.

To give another example, when the first roll 12 is an elastic metal roll, the first roll 12 deforms by 280 µm (0.11% of the diameter) in the applied direction of the load W under the linear pressure of 30 kg/cm, provided that the roll diameter $\phi$ is 250 mm. At this time, the contact length of the resin 15 is 16 mm.

Meanwhile, when the first roll 12 is a general metal roll, the metal roll deforms by 1.7 µm (0.0007% of the diameter) in the applied direction of the load W under the linear pressure of 30 kg/cm, provided that the roll diameter $\phi$ is 250 mm. At this time, the contact length of the resin 15 is about 1.26 mm.

Assuming that the elasticity of the first roll 12 is represented with a deformation amount in the diameter direction under the linear pressure of 30 kg/cm, when the deformation amount is below 0.01% of the diameter, the resin pressure increases at the nip position between the rolls 12 and 13 to thereby deform the rolls 12 and 13 and make it impossible to keep the high thickness accuracy in the width direction of the lenticular lens sheet 151. Besides, in this case, the resin 15 is susceptible to the discharge behavior and disturbance such as a cooled spot and the like, making it difficult to keep the thickness accuracy and uniform appearance with stability. Further, in this case, there is a need for a roll of high rigidity and a special structure for providing high pressure to the roll for tightly casting the resin 15 into a mold, resulting in a expensive facility.

Assuming that the elasticity of the first roll 12 is represented with a deformation amount in the diameter direction under the linear pressure of 30 kg/cm, when the deformation amount is above 10% of the diameter, the pressure of the resin 15 deforms the first roll 12 more greatly, making it hard to control the thickness accuracy and the shaping rate. Further, in this case, it is difficult to manufacture the first roll 12 such as can exhibit the stable performance and in addition, the durability of the first roll 12 drops.

The lenticular lens sheet 151 manufactured with the manufacturing apparatus 10 under the above conditions attains the thickness of 350 µm or smaller, desirably 200 µm or smaller, the mold pattern pitch of 290 µm or smaller, desirably 200 µm or smaller, the mold height of 0 µm to 100 µm, desirably, 30 µm or smaller, and the transferring rate of 90% or more, desirably 95% or more.

Also, the elasticity of the first roll 12 desirably falls within a range of 0.05% to 1.0%, more preferably, 0.1% to 0.5% of the diameter in terms of the deformation amount in the diameter direction under the linear pressure of 30 kg/cm.

As discussed above, the temperature of the discharged resin 15 from the die 11 is raised, the molding speed is increased to let the resin 15 reach the rolls 12 and 13 more speedily, and the air gap is reduced in size, so the temperature of the resin 15 touching the roll can be kept high. Therefore, the viscosity of the resin 15 can reduce, and the resin pressure applied during the roll-pressing process can be lowered. Further, if a resin of a low melt viscosity is used as the resin 15, the resin viscosity can be made lower, and the resin pressure applied during the roll-pressing process can further reduce. The melt viscosity of the resin when in touch with the roll is desirably 4,000 Pa·sec.

Owing to the low resin pressure of the resin 15 as mentioned above, it is possible to prevent the resin pressure from abruptly increasing during the roll-pressing process and to avoid such a situation that the rolls 12 and 13 deform due to the reaction force resulting from the abrupt increase in resin pressure. Thus, the contact portion distribution between the rolls 12 and 13 can be uniform, allowing the uniform thickness distribution of the resin 15.

Besides, the resin 15 can be smoothly cast in the shaping pattern in the second roll 13 during the roll-pressing process because of its low resin viscosity, so the transferability of a forming mold to the resin 15 and the molding accuracy can be improved.

Second Embodiment

When an elastic metal roll exhibiting an elastic behavior is used as the first roll 12, any optical sheet embossed on both sides can be formed by engraving a given shaping pattern on the first roll 12 as well.

Besides, the degree of freedom in design of an optical pattern to be transferred can be enhanced by attaching a mold plate around the second roll 13 by means of an adhesive. In addition, the heat insulating property of the second roll 13 can be improved, and an optical function sheet can be formed with the high thickness accuracy, high transferability, and the like.

Third Embodiment

Figure 4:
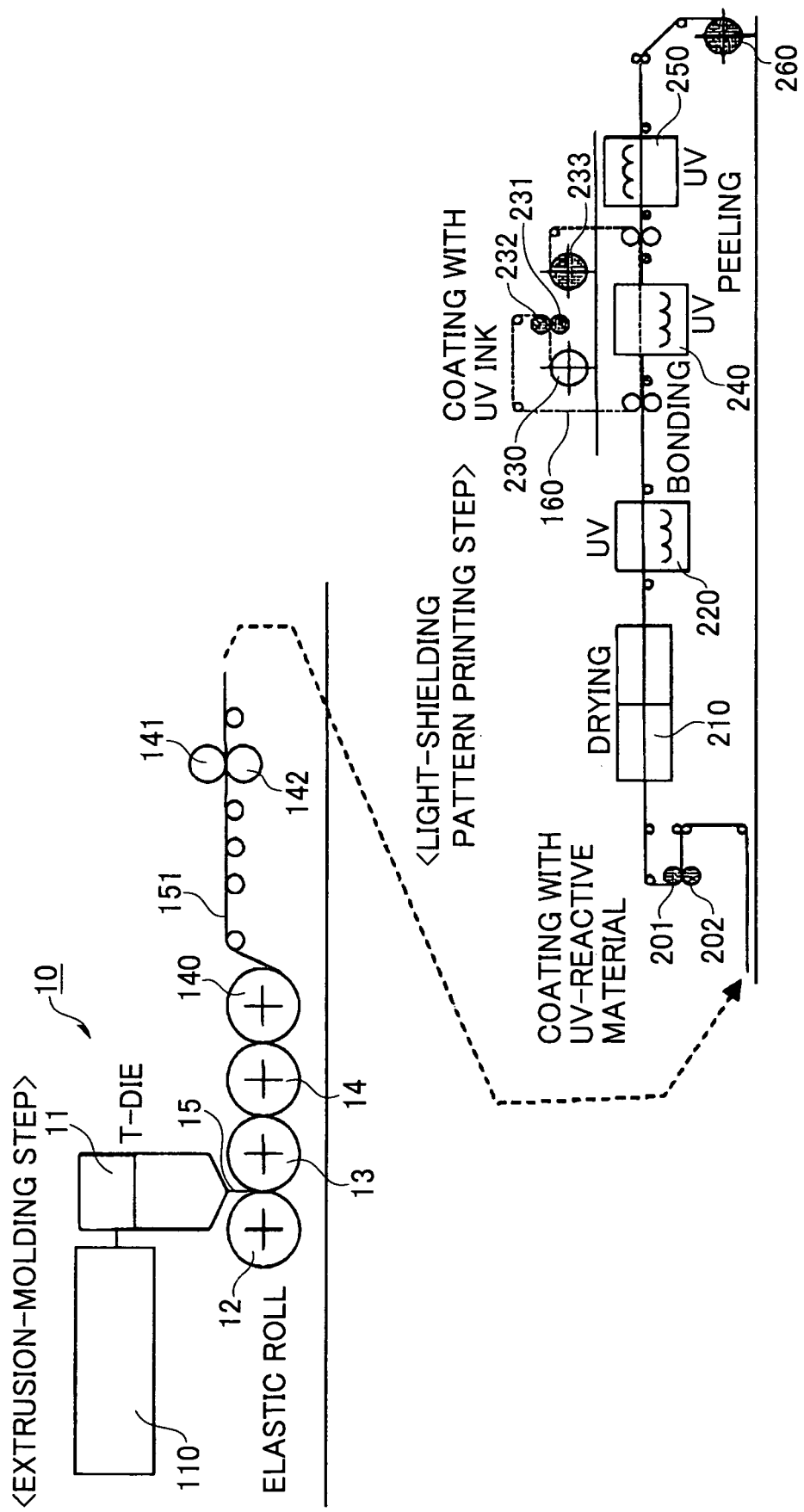
FIG. 4 is a schematic diagram showing an overall structure of a lens sheet manufacturing apparatus according to the present invention.

In a third embodiment, a description is given of an overall process of a manufacturing method for a lens sheet according to this embodiment with reference to FIG. 4. FIG. 4 is a schematic diagram showing a structural example of an entire lens sheet manufacturing apparatus.

In FIG. 4, reference numeral 10 denotes the lenticular lens sheet manufacturing apparatus; 11, the die; 110, an extruder; 12, the first roll; 13, the second roll; 14, the third roll; 140, a fourth roll; and 141 and 142, conveying rolls. As mentioned below, an elastic roll is used as the first roll 12.

The lenticular lens sheet manufacturing apparatus 10 mainly carries out the following extrusion-molding step. To elaborate, the die 11 first discharges the molten rein 15 by means of the extruder 110 to the air gap between the first roll 12 and the second roll 13. The discharged resin 15 is pressed against the second roll 13 by the first roll 12. At this time, the second roll 13 transfers the optical pattern for the lenticular lens onto the resin 15 and cools the resin concurrently. The lenticular lens sheet 151 having the optical pattern transferred thereon is passed through the third roll 14 and fourth roll 140 functioning as the annealing roll, and then conveyed by the conveying roll pair, the conveying rolls 141, 142, thereby completing the extrusion-molding step.

A step of printing a light-shielding pattern follows such an extrusion-molding step. In FIG. 4, reference numerals 201 and 202 denote coating rolls for coating a sheet with a UV-reactive resin; 210, a drying machine; 220, a UV irradiation device; 230, a roll; 231 and 232, coating rolls for coating a sheet with UV ink; 233, a roll; 240, a UV irradiation device; 250, a UV irradiation device; and 260, a roll.

In the step of printing the light-shielding pattern, first, a flat surface of the lenticular lens sheet 151 is coated with the UV-reactive resin by the coating rolls 201 and 202. The coated UV-reactive resin is dried in the drying machine 210, and irradiated with UV by the UV irradiation device 220. The UV-reactive resin is selectively cured due to a lens function of the lenticular lens sheet 151. After that, a film 160 coated with the UV-sensitive ink is bonded onto the UV-reactive resin on the lenticular lens sheet 141. The film 160 is prepared by applying the UV-sensitive ink to a film fed from the roll 230, by means of the coating rolls 231 and 232.

The lenticular lens sheet 151 is irradiated with UV from the flat surface side by the UV irradiation device 240, in the laminated state. Thus, the UV-sensitive ink on the film 160 is transferred onto an uncured portion of the UV-reactive resin of adhesion property. After the transfer, the film 160 is peeled off from the UV-reactive resin of the lenticular lens sheet 151, and then wound around the roll 233. The lenticular lens sheet 151 separated from the film 160 is irradiated with UV by the UV irradiation device 250, and its UV-reactive resin is completely cured. Then, the lenticular lens sheet 151 is wound around the roll 260 of the take-up machine, thereby completing the step of printing the light-shielding pattern.

In this way, the manufacturing method for the lens sheet according to the embodiment of the present invention encompasses the manufacturing method for the lenticular lens sheet (extrusion-molding step in FIG. 4) and the manufacturing method for the light-shielding pattern for forming the light-shielding pattern on the surface opposite to the lens surface of the lenticular lens sheet (step of printing the light-shielding pattern in FIG. 4). The extrusion-molding step is explained above in the first and second embodiments, so the following description of a fourth embodiment is focused on the manufacturing method for the light-shielding pattern.

Fourth Embodiment

Figure 5A:
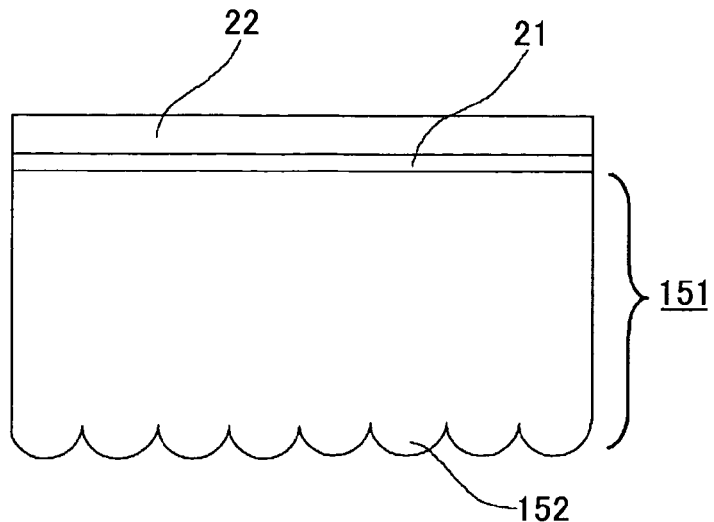
FIG. 5A is a sectional view showing a step of forming a photosensitive layer in a method of forming a light-shielding pattern according to the present invention.
Figure 5B:
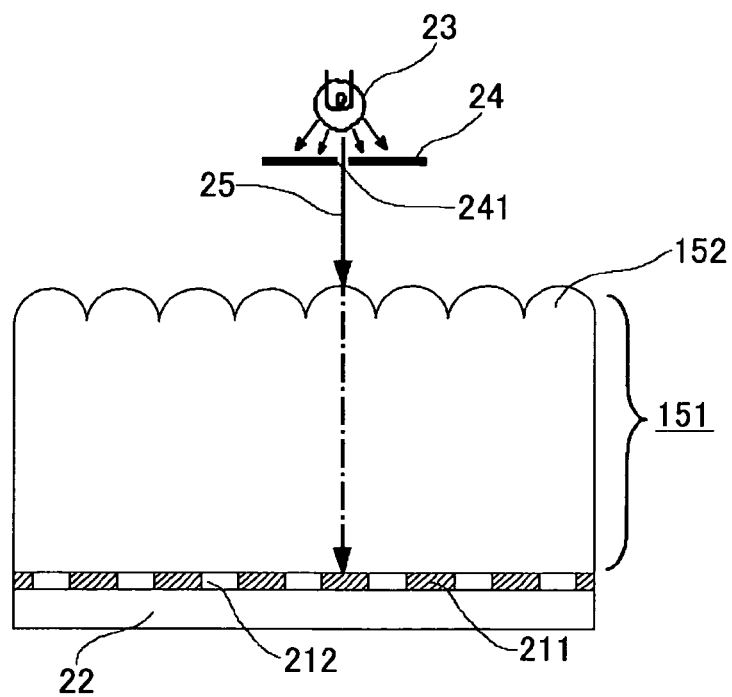
FIG. 5B is a sectional view showing an irradiation step in the method of forming a light-shielding pattern according to the present invention.
Figure 5C:
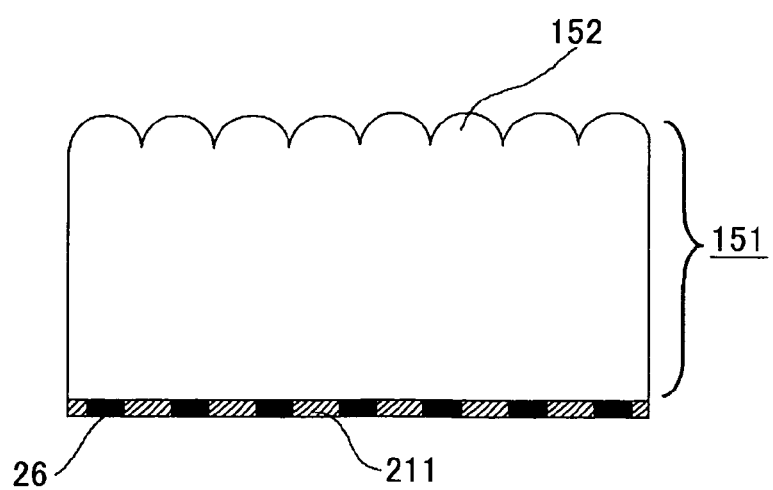
FIG. 5C is a sectional view showing a coloring step in the method of forming a light-shielding pattern according to the present invention.

In the fourth embodiment, FIGS. 5A, 5B, and 5C are referenced to describe the manufacturing method for the light-shielding pattern in detail. First, the manufacturing method for the light-shielding pattern utilizing a difference in adhesion force of a polymer layer is described. FIGS. 5A, 5B, and 5C are sectional views illustrative of the manufacturing method for the light-shielding pattern in respective steps.

As shown in FIG. 5A, a photosensitive layer 21 is formed on a flat surface of the thus-formed lenticular lens sheet 151. The photosensitive layer 21 may be formed of, for example, a UV-curable photosensitive resin. The photosensitive layer 21 is formed through direct printing, that is, by applying the photosensitive resin onto the flat surface of the lenticular lens sheet 151 using a gravure roll etc. A protective layer 22 is formed on the photosensitive layer 21.

As shown in FIG. 5B the photosensitive layer 21 is irradiated with UV from a light source 23, from a lenticular lens 152 side of the lenticular lens sheet 151. At this time, light emitted from the light source 23 enters the lenticular lens sheet 141 as slit light 25 having passed through an opening 241 of a mask 24. The slit light 25 enters the lenticular lens sheet 151 as slit light of a stripe shape elongated in a longitudinal direction of the lenticular lens sheet 151 (in the figure, direction vertical to a paper surface). The stripe-shaped slit light 25 is applied to the flat surface of the lenticular lens sheet 151 vertically from the lenticular lens 125 side while moving the lenticular lens sheet 151 in the arrangement direction of the lenticular lenses 152.

Irradiated with the slit light 25 from the light source 23 in this way, the uncured photosensitive layer 21 is exposed to UV incident from the lenticular lens 152 side. At this time, the slit light 25 is focused by means of the lens function of the lenticular lens 152. Then, portions irradiated with the focused light (hatched portions in the figure) of the photosensitive layer, that is, photosensitive layers 211 are cured and lose adhesion property. Here, the remaining portions not irradiated with the light focused by means of the lens function (in the figure, blank portions), that is, photosensitive layers 212 keep the adhesion property.

In addition, the stripe-shaped slit light 25 is applied to the photosensitive layer 21, so the photosensitive layer 211 having no adhesion property is formed in a stripe shape elongated in the longitudinal direction of the lenticular lens sheet 151. Thus, the photosensitive layer 212 having the adhesion property, which forms the photosensitive layer 21 except for the photosensitive layer 211, is formed in a stripe shape elongated in the longitudinal direction of the lenticular lens sheet 151.

As shown in FIG. 5C, the protective layer 22 on the photosensitive layer 21 is peeled off, and the uncured photosensitive layer 212 having the adhesion property is colored in black to form the light-shielding pattern composed of an external light absorbing layer 26. The light-shielding pattern is formed in a stripe shape similar to the photosensitive layer 212 since the photosensitive layer 212 having the adhesion property is formed in a stripe shape elongated in the longitudinal direction of the lenticular lens sheet 151.

The photosensitive layer 212 is colored by, for example, a method of laminating a transferring ink layer (black) of a transfer sheet on the photosensitive layer 21 and transferring an ink layer onto the photosensitive layer 212 having the adhesion property alone. Upon this transfer, no ink layer is transferred onto the photosensitive layer 211 having no adhesion property. Further, a photosensitive film may be laminated on the light-shielding pattern, and the laminated film is cured through UV irradiation to form a protective layer that prevents the ink layer on the photosensitive layer 212 from being peeled off.

To give another coloring method, black toner containing carbon black particles may be sprayed throughout the flat surface, after which the black toner sprayed to the photosensitive layer 211 having no adhesion property is removed to form the external light absorbing layer 26.

Figure 6:
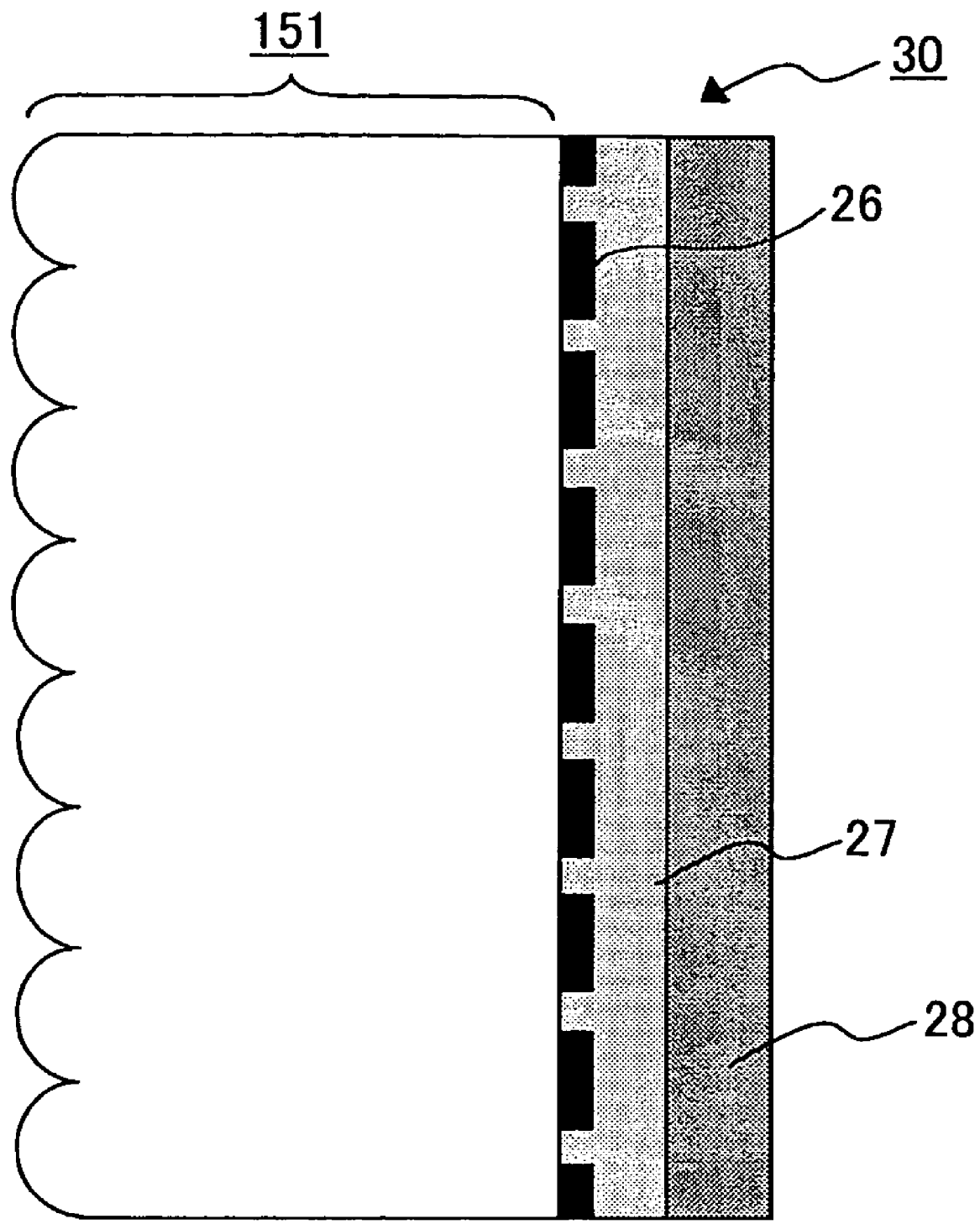
FIG. 6 is a sectional view showing a lens sheet according to the present invention.
Figure 8:
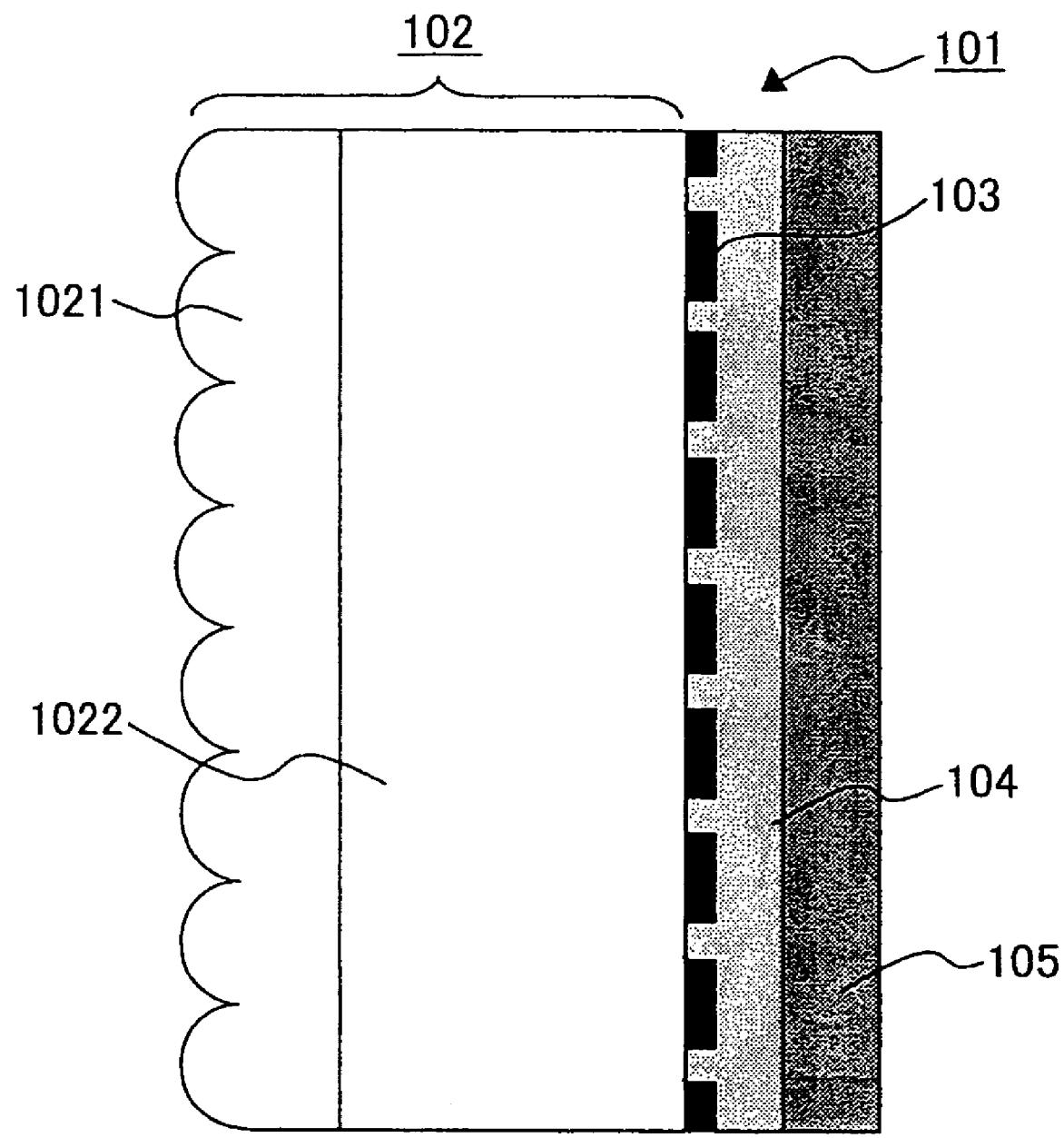
FIG. 8 is a sectional view showing a conventional lens sheet.

After the light-shielding pattern is formed, the entire surface of the photosensitive layer 21 is irradiated with UV to completely cure the photosensitive layer 21 (not shown). Subsequently formed on the light-shielding pattern is the diffusion layer 27 that diffuses light to expand the field of view as viewed from the flat surface side of the lenticular lens sheet 151. This diffusion layer doubles as a protective layer for the light-shielding pattern. Further, the diffusion layer 27 may be formed of a resin mixed with a dispersant such as silicon oxide or titanium oxide. In addition, a transparent resin film 28 is formed on the diffusion layer 27 to form a lens sheet 30 (FIG. 6).

As described above, the lenticular lens sheet 151 of the lens sheet 30 is produced through extrusion molding without using two different kinds of materials. This eliminates the need to use the 2P resin that costs high, so the production cost for the lenticular lens sheet 151 can be reduced. Also, the lenticular lens sheet 151 can be formed in a simple manner through extrusion molding, which eliminates the need for any complicated productive facility for the lenticular lens sheet 151.

Further, since the lenticular lens sheet 151 can be formed without using the 2P resin, the produced lenticular lens sheet 151 excels in environmental stability and never warps. Then, the lenticular lens sheet 151 is formed of a single kind of material, so the color unevenness can be suppressed, and the sheet transparency can improve. Further, the lenticular lens sheet is formed of a single kind of material, so blunting hardly takes place to attain satisfactory shaping property.

Moreover, since the lenticular lens sheet 151 is formed through extrusion molding, the thickness unevenness can be suppressed. Therefore, the external light absorbing layer 26 can be formed with accuracy through direct printing that would induce the thickness unevenness, making it possible to form the light-shielding pattern with precision. Further, the external light absorbing layer 26 is formed through direct printing, so a base film like a transfer film used for a transferring method is by no means discarded as wastes to thereby overcome a problem about its large environmental burdens.

Examples of the aforementioned manufacturing method for the lenticular lens sheet are described below. First, a description is given of Examples 1 to 5, and of Comparative Examples 1 and 2 in relation to Examples 1 to 5. After that, Example 6 and Comparative Example 3 are described.

Referring first to FIG. 7, Examples 1 to 5 according to the present invention are described. FIG. 7 is a table summarizing conditions adopted in these examples.

Example 1

Example 1 describes the case where an elastic MS resin (MFR=1.5) is used as the resin 15.

The elastic MS resin (MFR=1.5) was extruded at 250° C., and a shaping roll having a roll diameter φ of 400 mm and a rubber roll having a roll diameter φ of 290 mm (deformable in the diameter direction by 240 μm (0.08% of the diameter) under the linear pressure of 30 kg/cm) were used under the conditions that the air gap was 80 mm in size and the molding speed was 10 m/min. Thus, a uniform optical sheet having an embossed surface pattern transferred thereon was produced without a defective appearance such as an untouched portion, and with the thickness accuracy of 185±4 μm and the shaping rate of 97%.

Example 2

Example 2 describes the case where an MS resin with rubber (MFR=1.5) is used as the resin 15.

The MS resin with rubber (MFR=1.5) was extruded at 270° C., and a shaping roll having a roll diameter φ of 250 mm and an elastic metal roll having a roll diameter φ of 250 mm were used under the conditions that the air gap was 95 mm in size and the molding speed was 10 m/min. Thus, a uniform plate-like optical sheet having an embossed surface pattern transferred thereon was produced without a defective appearance such as an untouched portion, and with the thickness accuracy of 188±3 μm and the shaping rate of 99%.

Example 3

Example 3 describes the case where a PET resin (intrinsic viscosity=0.85) is used as the resin 15.

The PET resin (intrinsic viscosity=0.85) was extruded at 290° C. A shaping roll having a roll diameter φ of 400 mm and a rubber roll having a roll diameter φ of 290 mm were used as the second roll 13 and the first roll 12, respectively under the conditions that the air gap was 80 mm in size and the molding speed was 10 m/min. Thus, a uniform optical sheet having an embossed surface pattern transferred thereon was produced without a defective appearance such as an untouched portion, and with the thickness accuracy of 175±5 μm and the shaping rate of 95%.

Example 4

Example 4 describes the case where an MS resin with rubber (MFR=3.9) is used as the resin 15.

The MS resin with rubber (MFR=3.9) was extruded at 280° C., and a shaping roll having a roll diameter φ of 400 mm and an elastic metal roll having a roll diameter φ of 400 mm (deformable in the diameter direction by 110 µm (0.11% of the diameter) under the linear pressure of 30 kg/cm) were used under the conditions that the air gap was 80 mm in size and the molding speed was 16.0 m/min. Thus, a uniform optical sheet (lens pitch of 0.15 mmP) having an embossed surface pattern transferred thereon was produced without a defective appearance such as an untouched portion, and with the thickness accuracy of 181±2.5 µm and the shaping rate of 97%.

Example 5

Example 5 describes the case where an MS resin with rubber (MFR=3.9) is used as the resin 15.

The MS resin with rubber (MFR=3.9) was extruded at 280° C., and a shaping roll having a roll diameter φ of 400 mm and an elastic metal roll having a roll diameter φ of 400 mm (deformable in the diameter direction by 110 m (0.11% of the diameter) under the linear pressure of 30 kg/cm) were used under the conditions that the air gap was 80 mm in size and the molding speed was 25.0 m/min. Thus, a uniform optical sheet (lens pitch of 0.093 mmP) having an embossed surface pattern transferred thereon was produced without a defective appearance such as an untouched portion, and with the thickness accuracy of 105±1.5 µm and the shaping rate of 97%.

Referring next to FIG. 7, a description is given of Comparative Examples 1 and 2 as the related art in comparison with the present invention. FIG. 7 is a table summarizing conditions adopted in these comparative examples.

Comparative Example 1

Comparative Example 1 describes the case where no elastic roll is used.

Provided that two general metal rolls having a roll diameter φ of 400 mm were used for the rolls 12 and 13, the elastic MS resin was extruded at 250° C. In this case, achievements were the thickness accuracy of about 378±8 µm and the shaping rate of about 85% at most, under the conditions that the air gap was 120 mm, and the molding speed was 5.7 m/min., with the result that a thin, uniform optical sheet could not be formed.

Comparative Example 2

Comparative Example 2 describes the case where the elastic roll was used.

An MS resin with rubber (MFR=1.5) was extruded at 250° C., and elastic metal rolls each having a roll diameter φ of 250 mm were used as the rolls 12 and 13, that is, the rolls 12 and 13 under the conditions that the air gap was 105 mm in size and the molding speed was 5.8 m/min. In this case, an embossed surface pattern could be transferred with the thickness accuracy of 188±9 µm and the shaping rate of 97%, but a defective appearance was involved owing to an untouched portion, which inhibits the formation of a uniform optical sheet.

Next, an example of the aforementioned lens sheet is described in Example 6. Comparative Example 3 is incorporated herein for purposes of comparison with Example 6.

Example 6

The lenticular lens sheet 151 was mainly made of a methylmethacrylate-styrene copolymer, and was molded through extrusion molding by use of a metal roll having a lens shape engraved thereon. The lenticular lens sheet 151 prepared herein was the same as the lenticular lens sheet manufactured in Example 1.

The photosensitive layer 21 was formed by applying a UV-sensitive resin onto a portion opposite to a lens portion of the lenticular lens sheet 151 by using a gravure roll. Thereafter, the UV is applied from the lens portion side to form a non-adhesive portion (exposed portion, photosensitive portion 211) and an adhesive portion (unexposed portion, photosensitive portion 212). Next, BS (Black Stripe) printing was carried out with a black coating material or a transfer film coated with a black coating material attached to the adhesive portion to thereby form the external light absorbing layer 26. Thus, a lenticular lens sheet A was completed.

Comparative Example 3

A UV-curable resin containing urethane acrylate was applied on one side of a methylmethacrylate-styrene copolymer-made sheet (thickness of 100 µm) into the thickness of 10 to 15 µm. Then, a forming mold having a lens shape engraved thereon was pushed against the resin-coated surface, and the sheet was irradiated with UV from a side opposite to the forming mold to produce a lenticular lens sheet.

UV was applied to the photosensitive layer, which is formed by coating the portion opposite to the lens portion of the lenticular lens sheet with the UV-sensitive resin through a transfer method, from the lens portion side to thereby form the adhesive portion (unexposed portion) and the non-adhesive portion (exposed portion). Subsequently, the transfer film was attached to the adhesive portion, followed by BS printing to complete a lenticular lens sheet B.

For a comparison between Example 6 and Comparative Example 3, 1-mm thick foamed polystyrene sheets and 100 lenticular lens sheets A were alternately laminated, and 1-mm thick foamed polystyrene sheets and 100 lenticular lens sheets B were alternately laminated, after which the high temperature/high humidity test was performed on the lenticular lens sheets A and B under the conditions of 60° C., 95% RH, and 100 hours.

As a result of measuring how far each laminate sheet warps, the lenticular lens sheet A of Example 6 deformed by −6 mm on the short side, and +1 mm on the long side, while the lenticular lens sheet B of Comparative Example 3 deformed by +20 mm on the short side, and +2 mm on the long side. Evaluating each laminate sheet for installation to TV reveals that the lenticular lens sheet B of Comparative Example 3 deformed, and an image was out of focus and lacked in sharpness. In contrast, the lenticular lens sheet A of Example 6 was free from such defects.

As a result of evaluating a product after such a test for installation to TV, the lenticular lens sheet B of Comparative Example 3 has the problem that an unnatural luminance change was found in the horizontal viewing angle distribution of an image. Then, the lenticular lens sheet B of Comparative Example 3 was checked in section, and as a result, the top portion of the lens deformed. In contrast, the lenticular lens sheet A of Example 6 was free from such defects.

INDUSTRIAL APPLICABILITY

The present invention is useful in manufacturing a lens sheet for a rear projection screen used in a rear projection television, especially a rear projection type liquid crystal projection television.

The invention claimed is:

1. A manufacturing method for an optical sheet for passing a thermoplastic resin discharged from a die between a touch roll and a shaping roll under pressure, wherein
a temperature of the resin discharged from the die is in a range of 250° to 290° C.;
a molding speed is in a range of 10 to 25 m/min;
an air gap between the die and a nip position between the touch roll and the shaping roll is in a range of 110 mm or smaller, the touch roll comprising an elastic roll deformable in a diameter direction by 0.05% to 1.0% of a diameter under a linear pressure of 30 kg/cm; and
a thickness of the optical sheet is 200 µm or less, a mold pattern pitch is 290 µm or less, a mold height is in a range of 30 to 100 µm, and a transferring rate is 90% or more.

2. The manufacturing method for an optical sheet according to claim 1, wherein the thermoplastic resin is one selected from the group consisting of a polymethylmethacrylate resin, a polycarbonate resin, a polystyrene resin, an MS resin, an AS resin, an ABS resin, a polypropylene resin, a polyethylene resin, a polyethylene terephthalate resin, a polyvinyl chloride resin, a thermoplastic elastomer, and a copolymer thereof.

3. The manufacturing method for an optical sheet according to claim 1, wherein the optical sheet is a lenticular lens sheet.

4. The manufacturing method for an optical sheet according to claim 2, wherein the optical sheet is a lenticular lens sheet.

5. The manufacturing method according to claim 1, wherein
the mold pattern pitch is 200 µm or less, and
the transferring rate is 95% or more.

* * * * *